United States Patent [19]

Sakata

[11] Patent Number: 5,217,250
[45] Date of Patent: Jun. 8, 1993

[54] MODULAR COVER FOR AN AIR BAG ASSEMBLY

[75] Inventor: Yoshiaki Sakata, Hikone, Japan

[73] Assignee: Takata Corporation, Tokyo, Japan

[21] Appl. No.: 777,285

[22] PCT Filed: Jun. 6, 1991

[86] PCT No.: PCT/JP91/00763
§ 371 Date: Dec. 10, 1991
§ 102(e) Date: Dec. 10, 1991

[87] PCT Pub. No.: WO91/18769
PCT Pub. Date: Dec. 12, 1991

[30] Foreign Application Priority Data
Jun. 8, 1990 [JP] Japan .................. 2-150631

[51] Int. Cl.⁵ .............................. B60R 21/16
[52] U.S. Cl. ........................ 280/728; 280/731
[58] Field of Search ............ 280/728, 731, 743

[56] References Cited

U.S. PATENT DOCUMENTS 3,888,508  6/1975 Kizu et al. .
4,903,986  2/1990 Cok et al. .................. 280/731

FOREIGN PATENT DOCUMENTS 0207754  8/1988 Japan ........................ 280/743

Primary Examiner—Margaret A. Focarino
Assistant Examiner—Paul Dickson
Attorney, Agent, or Firm—Kanesaka and Takeuchi

[57] ABSTRACT

A modular cover for an air bag assembly has good appearance and is durable. The modular cover includes a main surface (3), four side walls (2A), (2B), (2C) and (2D) integral with the main surface (3), and a tear line (6) extending along only three of the four side walls (2B), (2C) and (2D).

5 Claims, 4 Drawing Sheets

MODULAR COVER FOR AN AIR BAG ASSEMBLY

TECHNICAL FIELD

The present invention relates to a modular cover for use in an air bag assembly and particularly, to such a modular cover which provides for full deployment of an air bag, which has good appearance, and which is durable.

BACKGROUND ART

As shown in FIG. 4, an air bag assembly is disposed centrally on a vehicle steering wheel 10 so as to deploy and inflate an air bag when sensing impact or deformation upon collision of a vehicle. This air bag assembly includes a mounting plate, commonly referred to as a retainer. An inflator and an air bag are mounted to the mounting plate and covered by a modular cover 11. The modular cover 11 is fit over spokes 12 of the steering wheel.

The modular cover 11 has tear lines 13 along which the modular cover can be ruptured when the air bag is deployed. The tear lines are in the form of a continuous groove or a semicontinuous groove. The tear lines may alternatively include spaced grooves of greater depth. When the cover has two different layers, a rigid layer i.e. and a soft layer, a slit may be formed in the rigid layer so that the cover may be ruptured along a predetermined line.

As shown in FIG. 4, the tear lines 13 of the prior art modular cover 11 are formed on a top or main surface 11A and includes tear lines 13a, 13b extending vertically along lateral sides of the main surface 11A, and another tear line 13c centrally and laterally of the cover 11. A vertical direction is a direction from an occupant M toward a windshield G, and a lateral direction is the width direction of a vehicle. In this case, the steering wheel is so oriented as to allow the vehicle to run on a straight line.

When such a conventional modular cover is molded, sinkmarks may be formed to cause wrinkles around the tear lines 13 on the top or main surface 11A of the modular cover 11. Those wrinkles, if quite visible, may deteriorate the esthetic appearance of the modular cover.

The occupant of a vehicle may rub such wrinkles with his fingers. This causes the tear lines to be repeatedly bent and deformed to reduce the durability of the modular cover 11.

A leather may overlie the main surface 11A of the modular cover to provide a high quality modular cover. In such a case, however, the leather may prevent the modular cover 11 from opening along the tear lines 13. As such, the leather can not be used in the prior art modular cover.

DISCLOSURE OF THE INVENTION

It is an object of the present invention to solve the problems encountered in the prior art and to provide a modular cover for use in an air bag assembly, which is free from any wrinkle on its main surface to provide good appearance, which is not repeatedly bent and deformed and is, thus, durable, and which includes a genuine leather on its main surface, but can be ruptured along tear lines.

The present invention provides a modular cover for use in an air bag assembly including a tear line and a shape in the form of a box with an open bottom and a closed top, wherein the tear line extends along a peripheral side wall of the modular cover except some part thereof, so that the entire main surface of the modular cover may be opened in the same direction when the modular cover is ruptured along the tear line.

With the modular cover of the present invention, the peripheral side wall of the modular cover, rather than the main surface, is ruptured along the tear line when the air bag assembly is operated. As a result, the entire main surface is opened toward one side on which no tear line is formed.

According to the present invention, the modular cover has no tear line on its main surface. Thus, the main surface is free from any wrinkles to provide good appearance. In addition, the tear line of the modular cover is not repeatedly bent and deformed to maintain the durability of the modular cover.

Also, according to the present invention, a high quality material such as a genuine leather may be applied to the main surface of the modular cover.

BEST MODE FOR CARRYING OUT THE INVENTION

The present invention will now be described in more detail, by way of example, with reference to the drawings.

Figure 1:
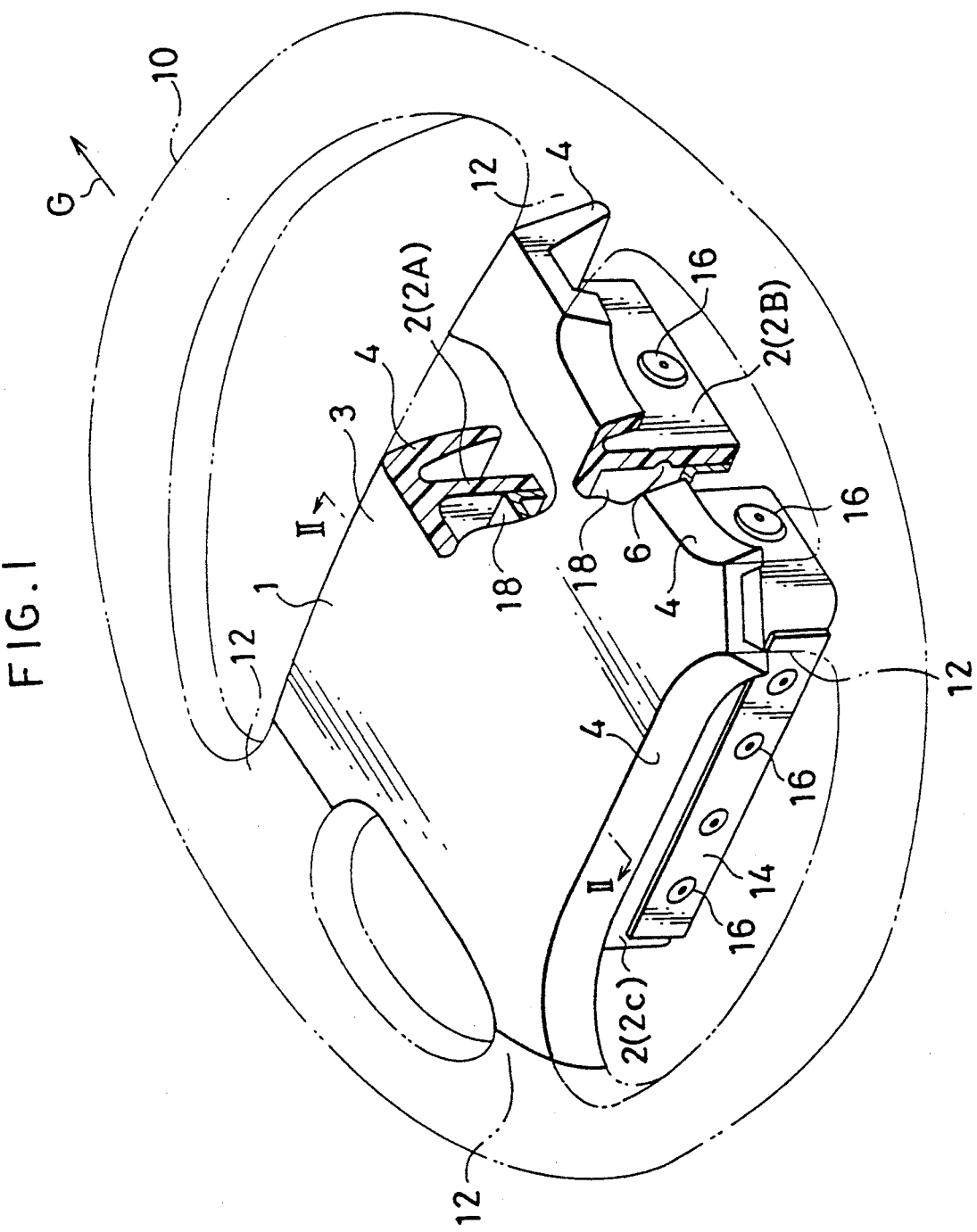
FIG. 1 is a perspective view, partly in section, of a modular cover for an air bag assembly according to one embodiment of the present invention.
Figure 2:
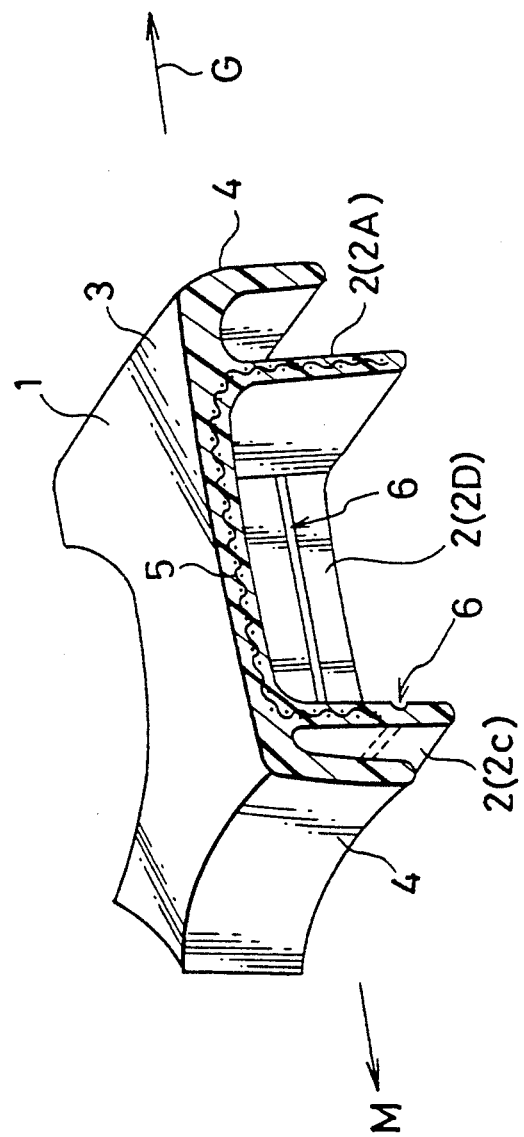
FIG. 2 is a Perspective sectional view taken on the line II—II of FIG. 1.
Figure 3:
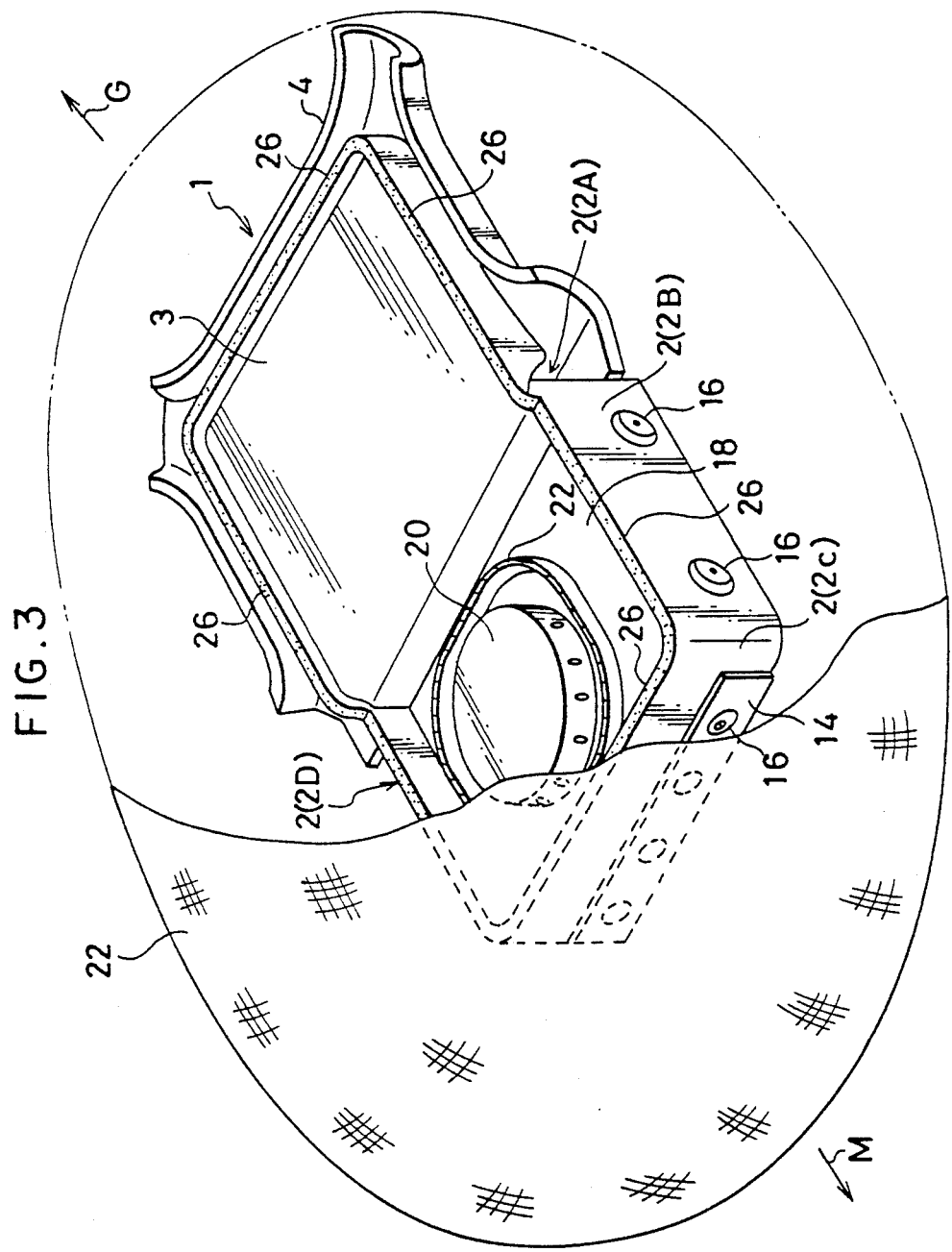
FIG. 3 is a perspective view, partly in section, of an air bag in its inflated condition.
Figure 4:
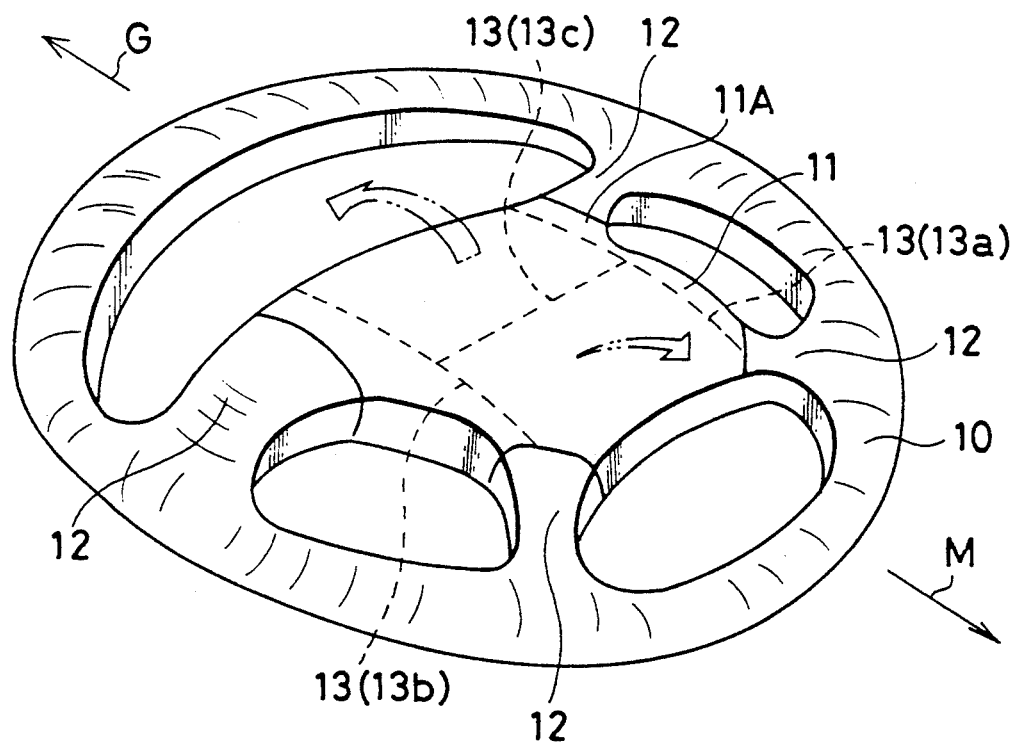
FIG. 4 is a perspective view of the prior art.

In FIGS. 1 to 3, 10 is a steering wheel, and 12 are spokes. A modular cover 1 is attached to a retainer 18 by means of press plates 14 and rivets 16. As shown in FIG. 3, an inflator 20 and an air bag 22 are also mounted to the retainer 18.

The modular cover 1 shown in FIGS. 1 to 3 has a box shape with an open bottom and a closed top and includes a peripheral side wall 2, a main surface 3, and a skirt 4 depending from the peripheral edge of the main surface 3. The peripheral side wall 2 and the main surface 3 are made of synthetic resin. A reinforcing cloth 5 is inserted into the peripheral side wall 2 and the main surface 3. This reinforcing cloth 5 is not shown in FIG. 1. The peripheral side wall 2 includes four side walls 2A, 2B, 2C and 2D, and the modular cover ruptures along a tear line 6 extending centrally and circumferentially of the three side walls 2B, 2C and 2D except the side wall 2A adjacent to the windshield G. The reinforcing cloth 5 is embedded in a portion of the modular cover other than that portion where the tear line is formed.

The side walls 2B to 2D of the modular cover 1 is ruptured when the air bag assembly is operated. At this time, the main surface 3 is not ruptured, but is largely opened toward the side wall 2A in which no tear line extends or toward the windshield G as shown in FIG. 3. The top of the modular cover 1 is thus open to allow deployment of the air bag 22. A region 26 shown in FIG. 3 is a section of the cover as ruptured along the tear line 6.

As stated above, the tear line 6 is formed on the side walls 2B, 2C and 2D, but not on the main surface 3 of the modular cover 1. The main surface 3 is thus free from any wrinkle to provide good appearance. Additionally, that portion around the tear line is not repeatedly bent and deformed to maintain the durability of the modular cover 1. A high quality material such as a genuine leather may also be applied to the main surface 3, but not to cover the tear line 6. Therefore, such a leather does not prevent rupture of the cover along the tear line 6 to allow immediate opening of the modular cover 1.

INDUSTRIAL APPLICABILITY

As is understood from the foregoing embodiments, the modular cover of the present invention has no tear line on its main surface. The tear line extends circumferentially along the side walls except some part. This design provides good esthetic appearance and increases the durability of the modular cover. The modular cover can effectively be ruptured and have a high quality material on its main surface.

I claim:

1. A modular cover for an air bag assembly comprising,
   a main portion having four side edges and a lower surface,
   four side walls located inwardly of said side edges and extending perpendicularly from the lower surface of the main portion, and
   tear lines formed in at least three of said side walls so that one side wall has a portion without a tear line and no tear line is formed in the main portion, said tear lines in the at least three side walls extending parallel to the side edges of the main portion so that when the air bag is actuated upon detection of a predetermined acceleration, the tear lines formed in said at least three side walls are ruptured to allow the main portion to bend entirely at the one side wall.

2. A modular cover for an air bag assembly according to claim 1, wherein the one side wall is located at a side close to a windshield.

3. A modular cover for an air bag assembly according to claim 1, wherein said modular cover has a portion joined to spokes of a steering wheel.

4. A modular cover for an air bag assembly according to claim 1, wherein said modular cover includes a skirt in surrounding relation to the four side walls.

5. A modular cover for an air bag assembly comprising,
   a main portion having four sides and a lower surface,
   skirts extending perpendicularly from the four side edges of the main portion,
   four side walls situated inwardly of the skirts and located at predetermined distances away from the respective skirts, said side walls extending perpendicularly from the lower surface of the main portion substantially parallel to the respective skirts and being adapted to be connected to a retainer, and
   tear lines formed in at least three of said side walls so that one side wall has a portion without a tear line and no tear line is formed in the main portion, said tear lines in the at least three side walls extending parallel to the side edges of the main portion so that when the air bag is actuated upon detection of a predetermined acceleration, the tear lines are ruptured to allow the main portion to bend entirely at the one side wall.

* * * * *